(12) United States Patent
Telem

(10) Patent No.: US 10,841,473 B2
(45) Date of Patent: Nov. 17, 2020

(54) PHOTO TERMINAL STAND SYSTEM

(71) Applicant: Foto Master Ltd., Rehovot (IL)

(72) Inventor: Boaz Telem, Nes Ziona (IL)

(73) Assignee: FOTO MASTER LTD., Rehovot (IL)

(*) Notice: Subject to any disclaimer, the term of this patent is extended or adjusted under 35 U.S.C. 154(b) by 0 days.

(21) Appl. No.: 16/575,575

(22) Filed: Sep. 19, 2019

(65) Prior Publication Data

US 2020/0068105 A1    Feb. 27, 2020

Related U.S. Application Data

(63) Continuation-in-part of application No. 15/841,335, filed on Dec. 14, 2017, now abandoned.

(60) Provisional application No. 62/435,965, filed on Dec. 19, 2016.

(51) Int. Cl.
| | |
|---|---|
| H04N 5/225 | (2006.01) |
| H04N 5/232 | (2006.01) |
| G02B 5/08 | (2006.01) |
| G03B 15/12 | (2006.01) |
| G06F 3/0488 | (2013.01) |
| G06F 3/041 | (2006.01) |
| G03B 15/03 | (2006.01) |
| G03B 13/08 | (2006.01) |

(52) U.S. Cl.
CPC ............ *H04N 5/2256* (2013.01); *G02B 5/08* (2013.01); *G03B 13/08* (2013.01); *G03B 15/03* (2013.01); *G03B 15/12* (2013.01); *G06F 3/0412* (2013.01); *G06F 3/0488* (2013.01); *H04N 5/2252* (2013.01); *H04N 5/2257* (2013.01); *H04N 5/23216* (2013.01); *G03B 2215/0539* (2013.01); *G03B 2217/002* (2013.01)

(58) Field of Classification Search
CPC ............ H04N 1/00289; H04N 5/2256; H04N 5/2257; H04N 5/23216; G03B 5/08; G03B 13/08; G03B 15/00; G03B 15/03; G03B 15/06; G03B 15/12; G03B 15/18; G03B 21/28; G03B 21/30; G03B 2215/0517; G03B 2215/0521; G03B 2215/0525; G03B 2215/0528; G03B 2215/0539; G03B 2215/055; G03B 2215/0582; G03B 2215/0585; G03B 2215/0589; G03B 2215/0592; G03B 2217/002; G06F 3/03547; G06F 3/0418; G06F 3/14; H05K 5/00–069
See application file for complete search history.

(56) References Cited

U.S. PATENT DOCUMENTS

| | | | | |
|---|---|---|---|---|
| 3,258,586 | A * | 6/1966 | Blizzard | G03B 15/05 |
| | | | | 362/18 |
| 2008/0002956 | A1* | 1/2008 | Iguchi | H04N 5/2251 |
| | | | | 396/2 |

* cited by examiner

*Primary Examiner* — Nhan T Tran
*Assistant Examiner* — Chriss S Yoder, III
(74) *Attorney, Agent, or Firm* — Browdy and Neimark, P.L.L.C.

(57) ABSTRACT

A photo terminal stand system is provided having a case, a one-way mirror, a computer display for presenting a graphical presentation seen through the one-way mirror, a camera, a touch overlay frame, a computer, configured to receive touch input from the touch overlay frame and responsively to activate the camera to record an image or a video sequence, a camera flash, and at least one of a reflector, a wheel bumper brake, and a service step ladder.

1 Claim, 17 Drawing Sheets

PHOTO TERMINAL STAND SYSTEM

CROSS-REFERENCES TO RELATED APPLICATIONS

The current application is a continuation-in-part of U.S. patent application Ser. No. 15/841,335, filed Dec. 14, 2017, and claims the benefit of Provisional Application No. 62/435,965 US, filed Dec. 19, 2016, both of which are incorporated herein by reference.

FIELD OF THE INVENTION

The present invention relates to the field of photo booths.

BACKGROUND

The term Photo Terminal Stand (PTS) refers herein to a Photo Booth implemented on a mobile stand.

PTS systems are common entertainment accessories at large-draw facilities such as carnivals, amusement parks and playgrounds. They are also common at private events, such as weddings, corporate social functions, and shopping mall promotions. However, the widespread use of such photo booths also has led to an opinion by market participants that the market is saturated and that the standard photo booth is a commodity. This viewpoint also lowers profits of photo booth operators.

More recent PTS system designs intended to provide innovation have generally been constructed from similar components and generally look similar to older photo booth designs.

In addition, more recent PTS systems are generally limited to off-the-shelf software tools, a factor that limits the variety of hardware that can be employed.

It is an object of the present invention to provide a solution to the above-mentioned and other problems of the prior art.

SUMMARY

An aim of the present invention is to provide a photo terminal stand system (PTS) that includes: a case, in which a front face thereof is a one-way mirror; a computer display, mounted behind the one-way mirror, for presenting a graphical presentation seen outside the case through the one-way mirror; a camera, mounted in the case; a touch overlay frame placed over the one-way mirror, for receiving a touch input; a computer, configured to receive the touch input and responsively to activate the camera to record a subject in front of the case; and a camera flash mounted inside the case to direct a flash through one or more openings at a top of the case when the case is in an upright position for operation. In some embodiments, the PTS includes a reflector having two alternative points of attachment to the case. When attached at a first point of attachment, the reflector is positioned to cover one or more openings at the top of the case during transit of the case, and wherein at a second point of attachment the reflector is positioned to reflect light from the camera flash towards the subject.

In further embodiments, the PTS includes a wheel bumper brake positioned in front of a front wheel of the case to brake the case when the case is tilted from its side to an upright position.

In further embodiments, the PTS includes a first ladder mount for affixing a service step ladder inside the case during transit and a second ladder mount for affixing the service step ladder in a tilted position against the case, when a case panel is open.

BRIEF DESCRIPTION OF DRAWINGS

For a better understanding of various embodiments of the invention and to show how the same may be carried into effect, reference will now be made, by way of example, to the accompanying drawings, in which.

Structural details of the invention are shown to provide a fundamental understanding of the invention, the description, taken with the drawings, making apparent to those skilled in the art how the several forms of the invention may be embodied in practice.

DETAILED DESCRIPTION

The present invention will be understood from the following detailed description of preferred embodiments ("best mode"), which are meant to be descriptive and not limiting.

For the sake of brevity, some well-known features, methods, systems, procedures, components, circuits, and so on, are not described in detail.

Figure 1:
FIG. 1 pictorially illustrates a Photo Terminal Stand (PTS), according to embodiments of the invention.

FIG. 1 pictorially illustrates a Photo Terminal Stand (PTS) 20, according to embodiments of the invention. The PTS 20 is shown as it may appear when being operated by a user 30. The site of operation is preferably an entertainment venue, such as a shopping mall, exposition, a celebration hall, and the like.

Figures 13A, 13B:
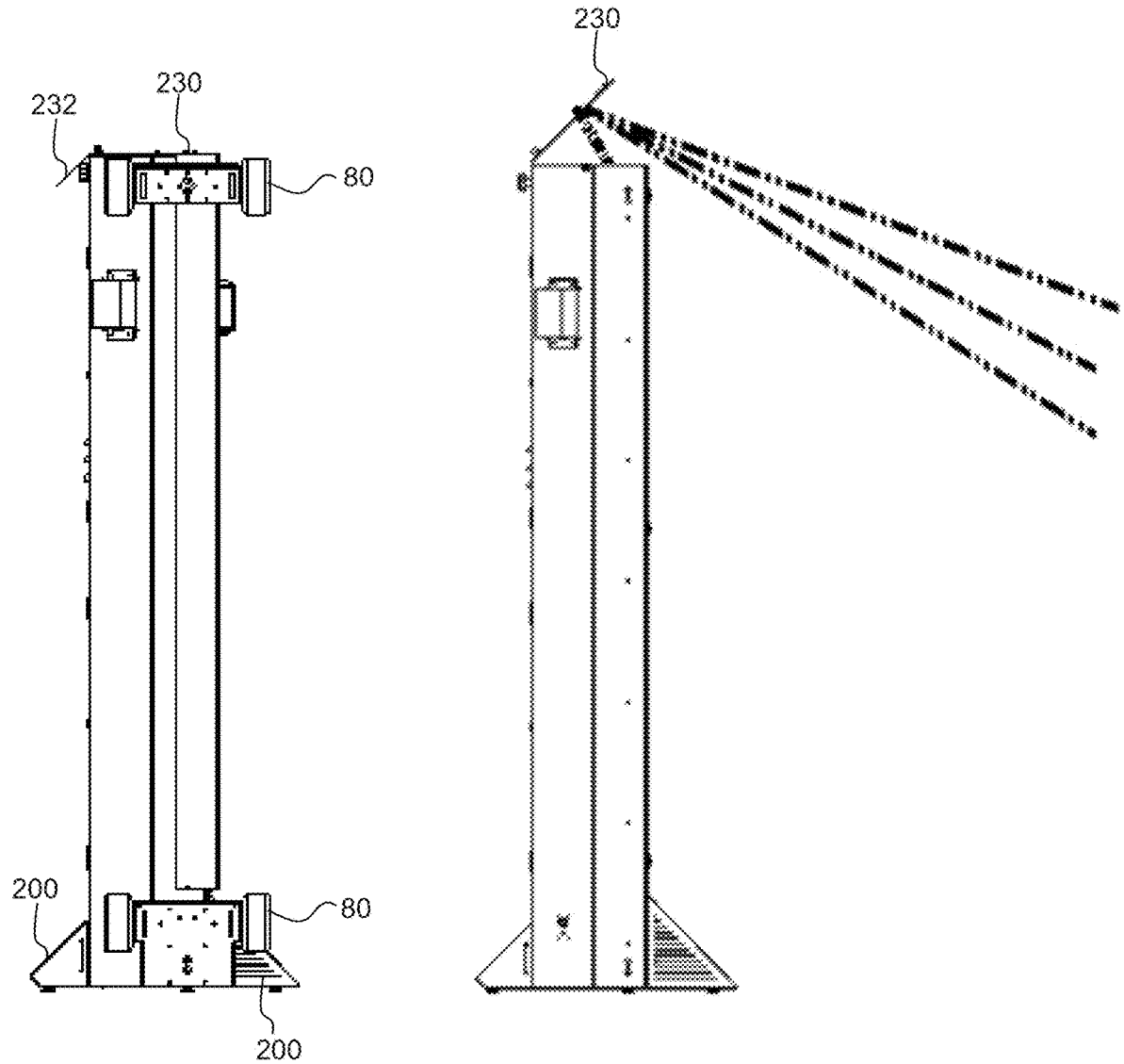
FIGS. 13A and 13B pictorially illustrate views of a PTS for respective sealed and operating configurations of a PTS, according to embodiments of the present invention.

The PFS includes a large case 40, having a front facing mirror 50. The front side of the case may be inclined, with an inclination angle being at least 5 degrees to 15 degrees from the vertical. Alternatively, the front face of the mirror may be perpendicular to the ground, with no inclination, as indicated in FIGS. 13A and 13B.

Dimensions of the case of the represented embodiment are configured such that the case rests firmly on its base in an upright position on the floor. Heights of the case may be a range of sizes, for example, from 5 ft. to 7 ft. Base dimensions may be, for example, 3 ft. by 2 ft. Different configurations of the case include an elliptical or circular front, such as is typical for beauty mirrors, which may be positioned on legs or on a stand during operation.

In further alternative embodiments of the invention, mirror 50 may be affixed to a case that may be permanently or semi-permanently mounted to a wall. In still further configurations, the mirror may be detachably affixed to a wall so as to cover a niche in a wall. The width of the case, or alternatively the wall niche, is generally configured as a minimum width necessary to include the elements of the interactive camera mirror as described hereinbelow.

When provided in a wall-mounted or wall niche configuration, the interactive camera mirror provides an especially small footprint, allowing the system to be conveniently located at sites with limited space, such as retail stores. Placement of the system in retail stores may enhance the shopping experience for the user, while also providing a social media marketing tool for the store owner.

Hereinbelow, the term "one-way mirror," also called two-way mirror (or two-way glass) or semi-transparent mirror, refers to a mirror that is partially reflective and partially transparent, with higher reflectivity being achieved when the outer side of the mirror is brightly lit and inner side is dark.

The mirror may be a 6 mm tempered, one-way reflective mirror. In general, the mirror is at least 4 mm thick glass. The high quality mirror provides the system with an aesthetic appearance that attracts the attention of potential users. The tempering is essential since a user or a child may un-deliberately kick the mirror, and get injured.

A frame 55 of the mirror 50 may be decorative and detachable, thereby allowing replacement by another frame.

In some embodiments, the frame is supplied in four pieces, for each side, each piece being individually attachable to the case by connectors supplied with the frame parts. Provision of the picture frame as individual pieces facilitates compact, secure transportation. The frame may have an appearance of carved wood or metal, or other form designed to have an elegant appearance, to maintain a high aesthetic appeal of the system. The external picture frame may also be supplemented by an internal frame of lights, such as decorative LED lamps, to further enhance the appeal and to add visual cues to other events related to interaction with the system.

During operation of the PTS, various animations 60 appear on the face of the mirror 50. These animations include attractive graphics to engage the user, as well as instructions to the user, and buttons and other means for eliciting user responses, including receipt of instructions from the user that trigger actions by the system. The animations displayed can be any combination of text, photos, images, videos, cartoons, graphics etc., and are preferably accompanied by sound (music and/or voice).

Figure 2:
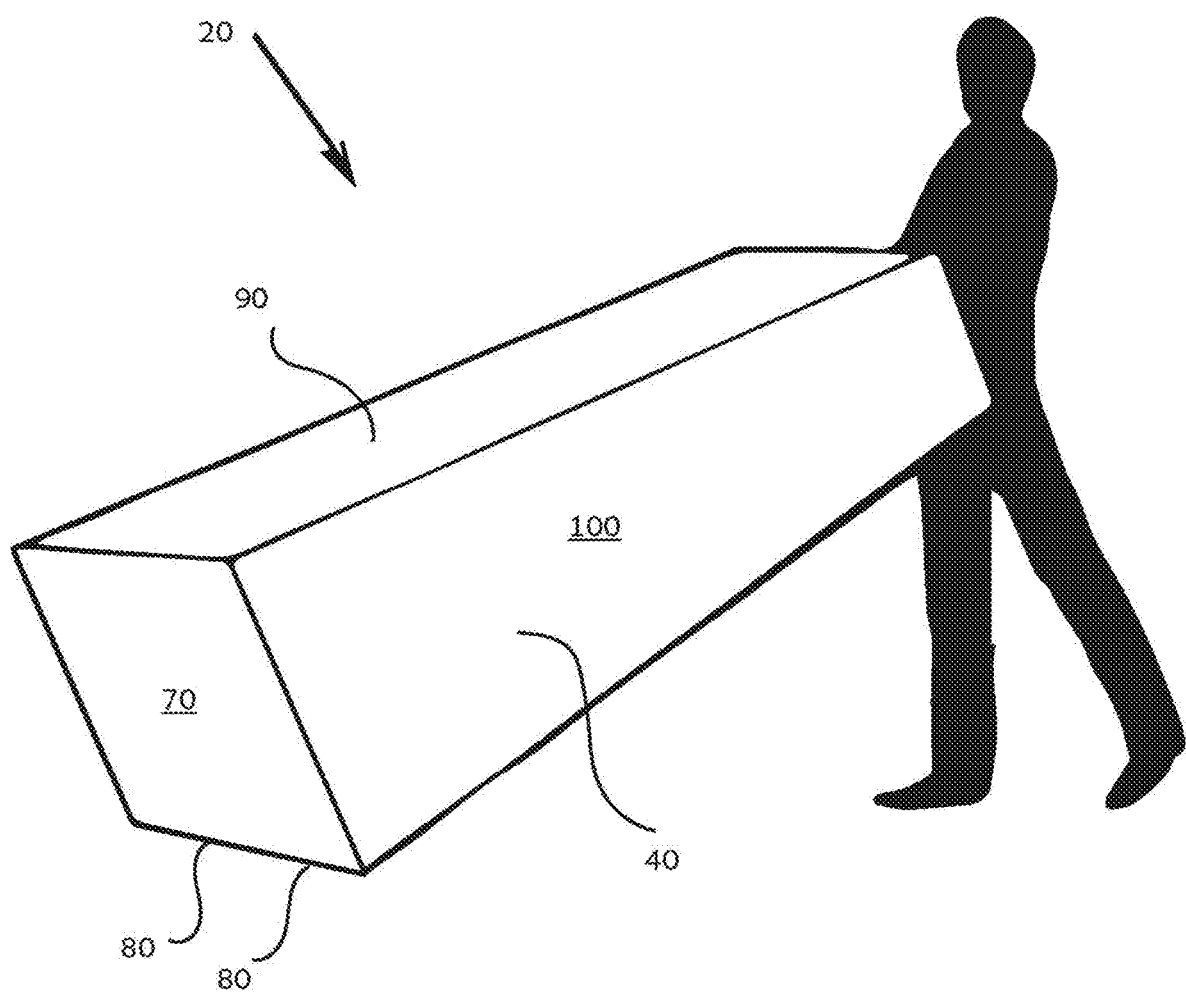
FIG. 2 pictorially illustrates a way of moving a PTS, according to embodiments of the invention.

FIG. 2 pictorially illustrates a way of moving the PTS of FIG. 1, according to embodiments of the invention.

On one edge of the bottom side 70 of the case, wheels 80 are affixed in order to facilitate convenient transport and portability. In additional or alternative embodiments, wheels may also be on a second edge of the bottom side, to allow transport through narrow passageways. A cover 90 is attachable to the front side of the case to protect mirror 50. Cover 90 has a hard case exterior and foam interior to protect the mirror.

Sides 100 of the case are generally trapezoidal in shape, as shown, providing the inclination on the front side as described above.

Figure 3:
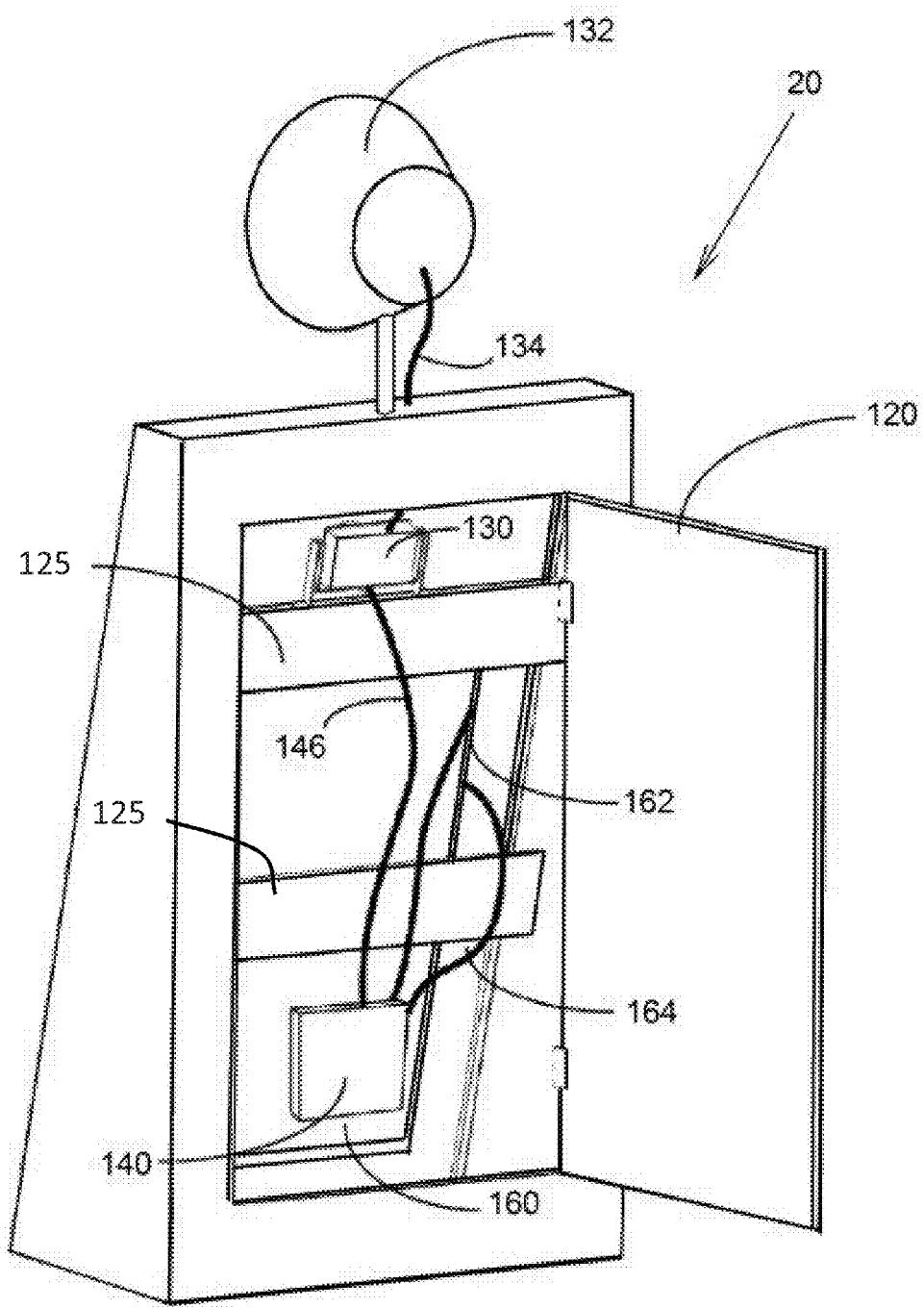
FIG. 3 pictorially illustrates a back side of a PTS, according to embodiments of the present invention.

FIG. 3 pictorially illustrates the back side of PTS 20 of FIG. 1, according to an embodiment of the present invention.

The back side has at least one back panel 120, which is shown in the figure in an open state. When the panel is open, an operator can access components inside the case as necessary for installation and maintenance.

The interior side of the mirror must be kept dark, i.e., the case 40 must be opaque, and the mirror must be one-way. The one-way mirror is highly reflectivity only when there is no light from behind the mirror, that is, when no light can enter the interior side of the case from any side other than the mirror side. As such, during operation the door must be closed and all other openings, such as connector seals, are insulated from light intrusion, so that the interior of the case remains dark. In addition, all parts of the interior are painted black. In alternative embodiments, the hinged panel may be positioned on the side of the case 40.

A primary function of the PTS is to photograph users, a function that is enabled by a camera 130, which is mounted inside the case. Although the mirror is one-way, sufficient light can penetrate through the mirror, preferably (but not mandatory) when a flash is operated, to enable the camera to photograph through the glass of the mirror. The camera is generally a digital single-lens reflex (DSLR) camera, or other type of camera with similar specifications, wherein the specifications include a high quality lens, large sensor, and fast autofocus, as well as configurable settings for parameters such as: aperture size, shutter speed, ISO, white balance, white balance shift, photo dimensions and pixel size. The sensor has at least a 1" format and preferably an APS-C or larger format. Such cameras allow high quality pictures to be taken, despite the variable conditions of the typical setting in which the system operates, which includes a wide range of lighting conditions. The camera may shoot stills pictures and/or video sequences.

The ability to alter camera settings of white balance and shift was found to be important in order to overcome the color aberrations caused by shooting through the mirror.

Also shown in FIG. 3, there are internal mounting brackets 125 of the PTS, which provide support for various components, including the camera.

The PTS typically includes a flash head 132. The flash head may be affixed with a suitable mounting bracket on the top of the case, within a "soft box" or "beauty dish," as indicated in FIG. 3. Alternatively, the flash head may be affixed inside the case, as indicated hereinbelow with respect to FIG. 13B, which shows the light from the flash head projected upwards through the top of the case and reflected off of a reflector towards a subject (i.e., the user) in front of the case. Also provided are suitable connectors 134 for providing power to the flash head, as well as a flash signal from the camera. The flash head 132 may be of several types, such as a 400 W flash head. The flash head 132 may be supplemented by a beauty dish or reflector. When mounted inside the case, the flash may be insulated, thereby preventing light from the flash head from being reflected off of the inner surface of the mirror towards the camera shutter.

A computer 140 controls the triggering of shots by the camera, by means of a camera connector 146. For some cameras, the connection may include a "hot shot" accessory.

Additionally, the computer runs graphical software, which embeds a stills image and/or a video sequence taken by the camera in a graphical template. For example:

The graphical software may be also of a computer game which employs as input the coordinates on which a user touches the mirror, thereby using simultaneously a plurality of fingers as pointers. This allows, for example, sophisticated input such as means to rotate an object displayed on the mirror.

The computer also runs a user interface module, for allowing a user to interact through input means with the graphical software.

Computer 140 may be a desktop type PC or a notebook PC (laptop), to provide greater convenience for configuration and installation. Generally the computer may be configured for graphics support, such as a DX11 capable graphics adapter. Other aspects of the recommended configuration include at least 4 GB of memory and a 64 bit processor. In some embodiments, the computer is configured with a Windows 8 (x64) operating system.

Computer 140 may be external to the case 40, but is generally installed within the case to improve security and reliability of operation. When the computer is installed internally, it is generally installed together with a large fan, which may be temperature controlled, to prevent overheating inside the sealed case. In typical configurations, a photo printer is also installed internally in the case, or at an accompanying, external print stand.

Computer 140 is configured to control multiple operations of the system in addition to triggering the camera, these operations including sensing user interaction and/or generating the animations that from the user perspective appear on the face of the mirror, as described above. The computer may be configured to record images and video clips from the camera. The computer may be configured to send images to the printer, with or without further processing. In additional or alternative embodiments, the computer may also be configured with a direct output connection to a printer. The computer may be configured to print multiple copies of images, or print them in vertical or horizontal strips, according to user input.

The computer may also be configured to share images and video clips remotely with cloud-based channels, such as a user's email or social media channels (e.g., Twitter, Facebook, and Instagram).

The computer may be further configured such that operations, such as photographing, printing, and sharing of images, video clips and gif files, are conditional on the user being identified or performing certain tasks. For example, the system may include an RFID sensor, to identify a user by an RFID tag. The user may be required to register, which may be performed interactively through the touch or motion sensor device.

The user may be required to pay, preferably through mechanisms available through a mobile device, such as a payment application on an Apple device or Android-based device. In some embodiments, only registered users are allowed to use the application with all its features.

Other input and devices for output may also be connected to the computer. Sensors to recognize user input may include light and/or motion sensors, including an infrared/accelerometer combination such as the Wii Remote by Nintendo.

Output devices may include extra lighting around the mirror edges. As described above, LED lights may be affixed on the inner side of the mirror near the picture frame and may be operated by the computer to attract user attention and to signify recognition of actions by the user, such as success in a game. LED lights may also be affixed on the inner side of the mirror around the camera to attract the attention of a user to the direction in which the user should look just before a photo is taken.

Animations appearing on the mirror are generated on a TV screen, preferably a flat TV screen or computer monitor 160. The monitor is positioned behind the mirror, that is, between the mirror and the interior of the case. The monitor is connected to the computer by monitor connector 162, which generally is an HDMI connector. In addition the computer is connected to the user input device 170 by connector 164, such as a USB connector.

Figure 4:
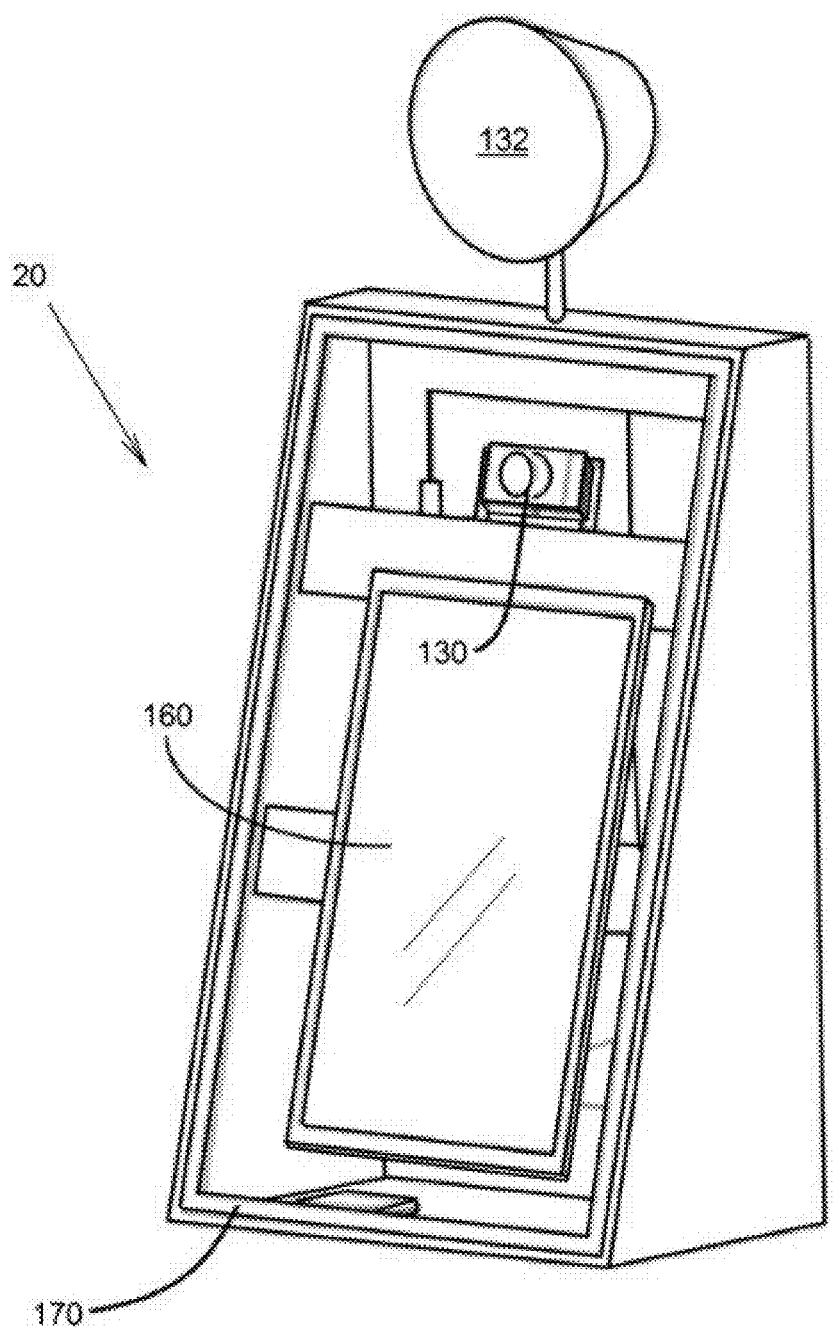
FIG. 4 pictorially illustrates a front side of a PTS, according to embodiments of the present invention.

FIG. 4 shows a schematic, pictorial illustration of the front side of system 20, according to an embodiment of the present invention.

Shown is the case with the mirror removed, thereby revealing a front view of the monitor that is mounted on the bracket within the case. The monitor is generally touching or in close proximity to the underside of the mirror. The flat screen mount is preferably implemented by the Flat Display Mounting Interface (FDMI) standard, also known as VESA Mounting Interface Standard (MIS) defined by the Video Electronics Standards Association for mounting flat panel monitors, TVs, and other displays to stands or wall mounts. In one embodiment, the mount is a VESA 200×200 mount.

The animations that appear on the mirror are generated on the surface of the monitor by the computer. As shown, the monitor is smaller than both the picture frame and the mirror, thereby allowing the camera, and in some embodiments, the flash, to operate within the case, above the monitor, without being blocked by the screen of the monitor. In one embodiment, the flat screen TV is a 42" or 43" screen, with black borders.

Preferably, user input is implemented by means of a touch overlay frame 170. The touch overlay frame 170 is an overlay frame, such as an infrared (IR) multi-touch overlay such as the product available from PQ Labs. The touch overlay frame includes the connector 164, referred to above, which transmits signals related to contact points on the mirror to the computer. In alternative embodiments, a foil touch overlay is employed instead of the infrared touch overlay. The foil touch overlay covers the entire surface of the mirror and has an advantage over the infrared multi-touch overlay, which is that the foil can be provided to suit different shapes of a mirror, such as an oval mirror.

In general, the user input is configured to recognize multiple, simultaneous user signals, such as multiple touches on the touch overlay frame, thereby permitting simultaneous input by multiple users, such as simultaneous "signature" signing. The photo mirror may be further configured to receive audio input from the user by means of a microphone. For example, a "screaming" game may be configured by which the animation indicates a volume of the user's voice. Alternatively or additionally, the photo mirror may receive motion input from the user, such as hand motions in the air. These signals may be received through a video motion sensor, such as a Microsoft Kinect motion sensor, or an accelerometer/infrared combination device, such as a Nintendo WII remote.

Figure 5:
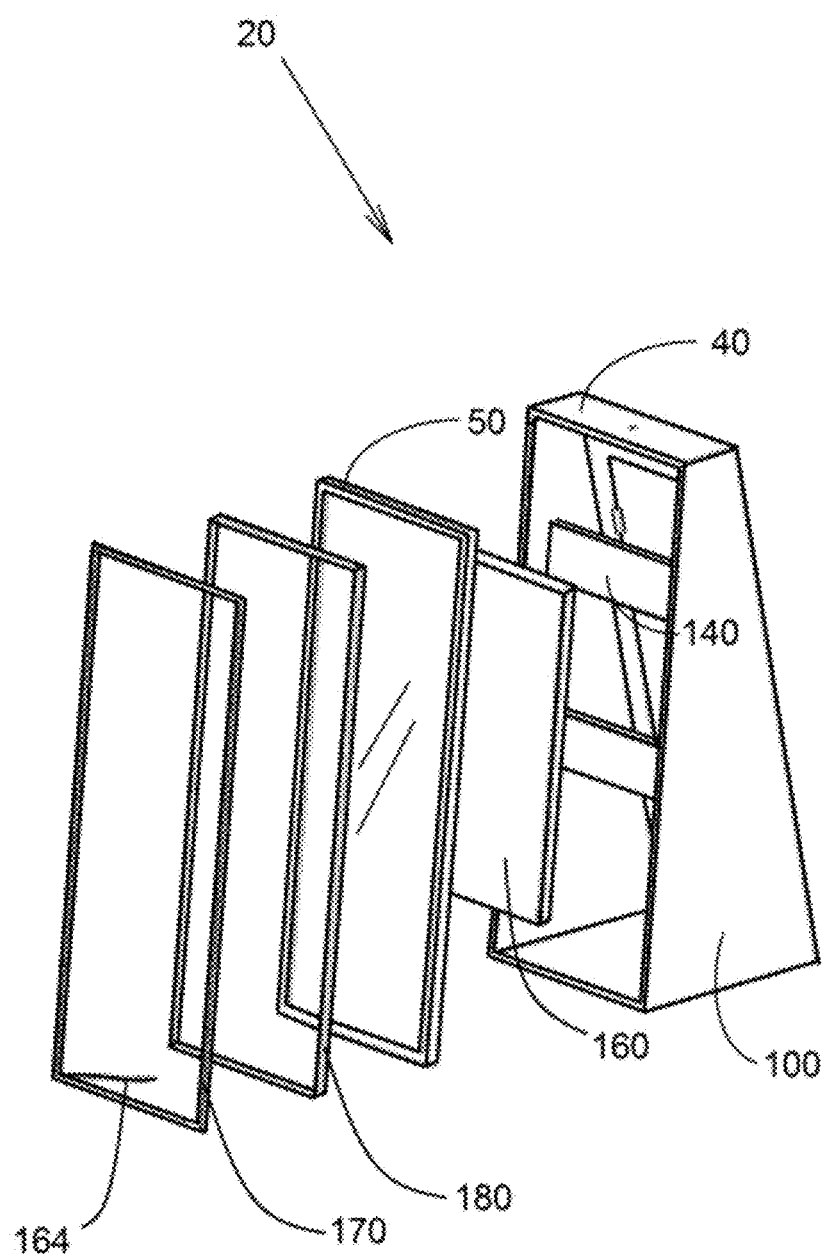
FIG. 5 is an exploded view of components of a PTS, according to embodiments of the invention.

FIG. 5 is an exploded view of the components of a PTS, according to embodiments of the invention.

Previously noted components of the system include the case 40, the mirror 50, the case sides 100, the internal mounting bracket 125, the flat screen TV 160 and the touch overlay frame 170, and the touch device connector 164. The mirror is generally mounted to the case with a mirror mount 180.

In embodiments of the present invention, the coordinates of the mirror recognized by the touch overlay frame are calibrated by an operator upon the initial installation of the system.

As detailed hereinafter, a calibration program provides instructions on the video screen display, which is viewed by the operator through the mirror. The computer is configured to indicate the four corners of the computer display 160, which the operator then touches. The signals from the touch overlay frame are received by the computer, which is configured to maintain a correspondence between the coordinates recognized by the touch overlay frame and the corresponding points on the mirror.

In some embodiments of the present invention, the computer operates a Microsoft Windows™ OS, such as Windows 8. Next, the operator executes a calibration program designed for the photo mirror.

Subsequently, the operator executes the photo mirror application, which the operator has configured in advance by means of a configuration platform, described further hereinbelow. The photo mirror application displays animations on the mirror, which include instructions for user interaction.

Figure 6:
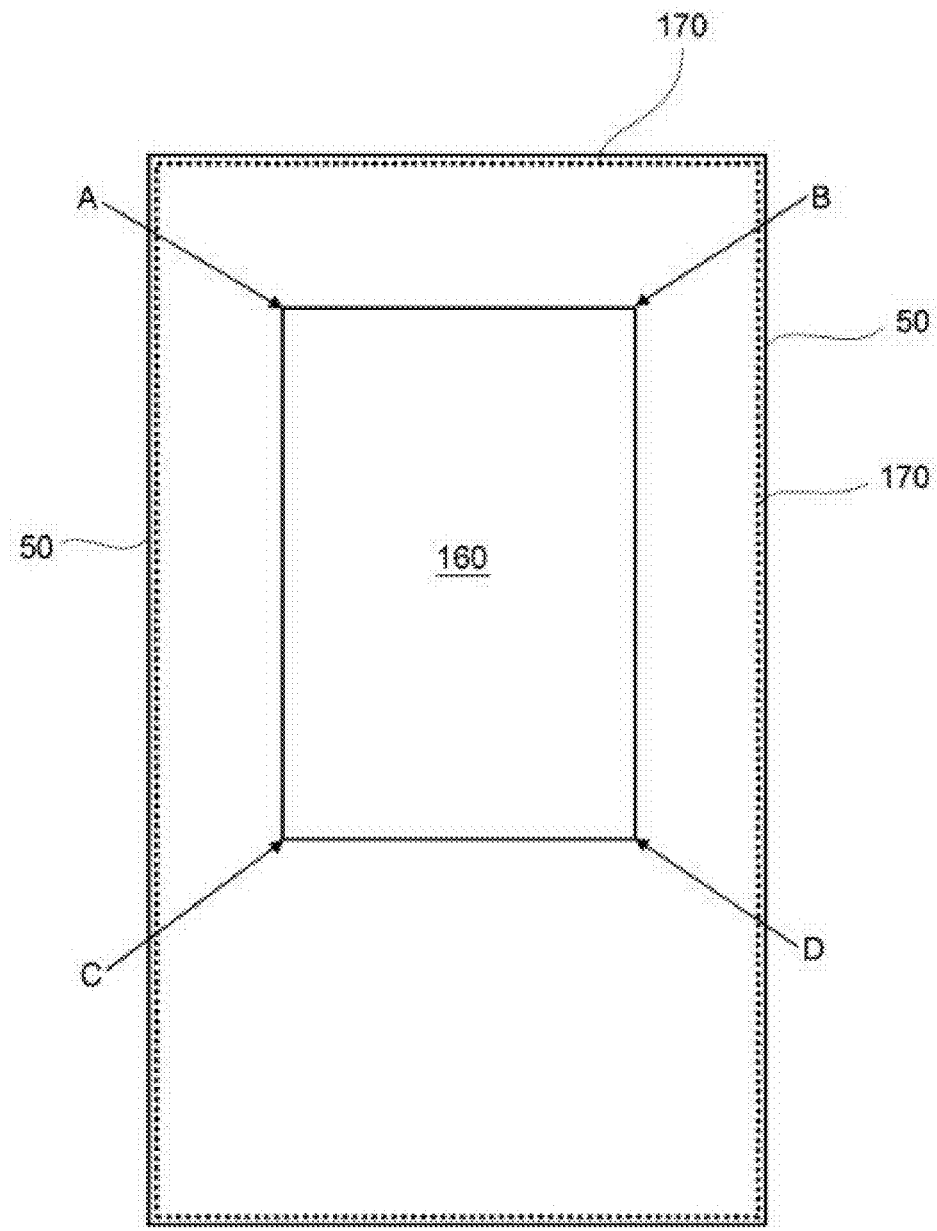
FIG. 6 schematically illustrates elements of mapping coordinates of a mirror of a PTS onto coordinates of a display, according to embodiments of the invention.

FIG. 6 schematically illustrates the elements in mapping a coordinate of the mirror into coordinates of a display, according to embodiments of the invention.

One of the problems a PTS must deal with is how to map the coordinates of a point of the mirror 50 into the coordinates of the point on the display 160. The problems stem from the fact that the physical dimensions of mirror 50 are greater than the dimensions of the display 160. In addition, the resolution of the touch overlay frame 170 is different than the resolution of the display 160.

The solution is a calibration which is carried out as follows: During the system setup the technician is asked to point on the four points A, B, C and D of the mirror which are the four corners of display 160. Since the dimensions of display 160 are known, this information (i.e., the coordinates of the four corners of the display frame on the mirror, i.e., on the touch overlay frame) allows mapping a point on the mirror to a point on the display. The coordinates of the mirror are detected by the touch overlay frame 170.

From this point on, when the user touches the mirror with his finger, the coordinates of the mirror) i.e., the touch overlay frame) are mapped into the coordinates of the display, so the computer can indicate in which point of the display the user has pointed.

It should be noted that the touch overlay frame can be configured to obtain multiple touch points, such as touching the mirror by a plurality of fingers.

Figure 7:
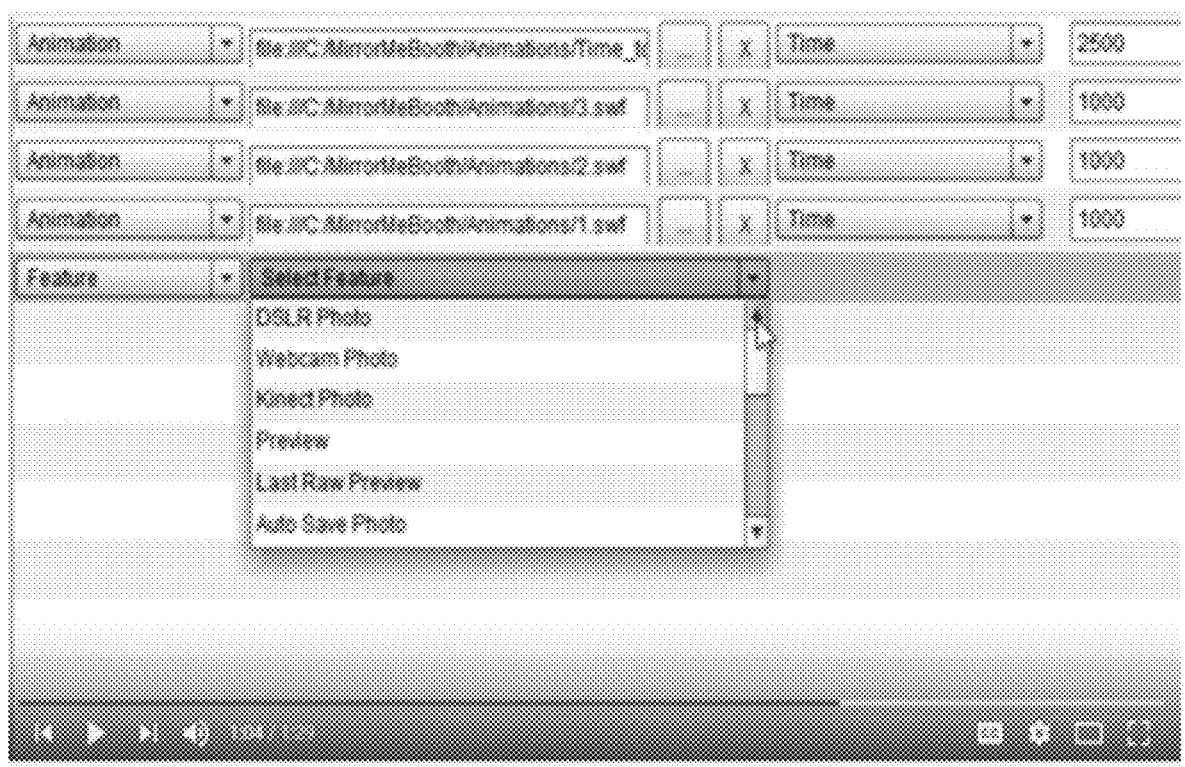
FIGS. 7 and 8 show schematic, pictorial illustrations of a configuration platform for customizing PTS operation, according to embodiments of the present invention; according to embodiments of the present invention.
Figure 8:
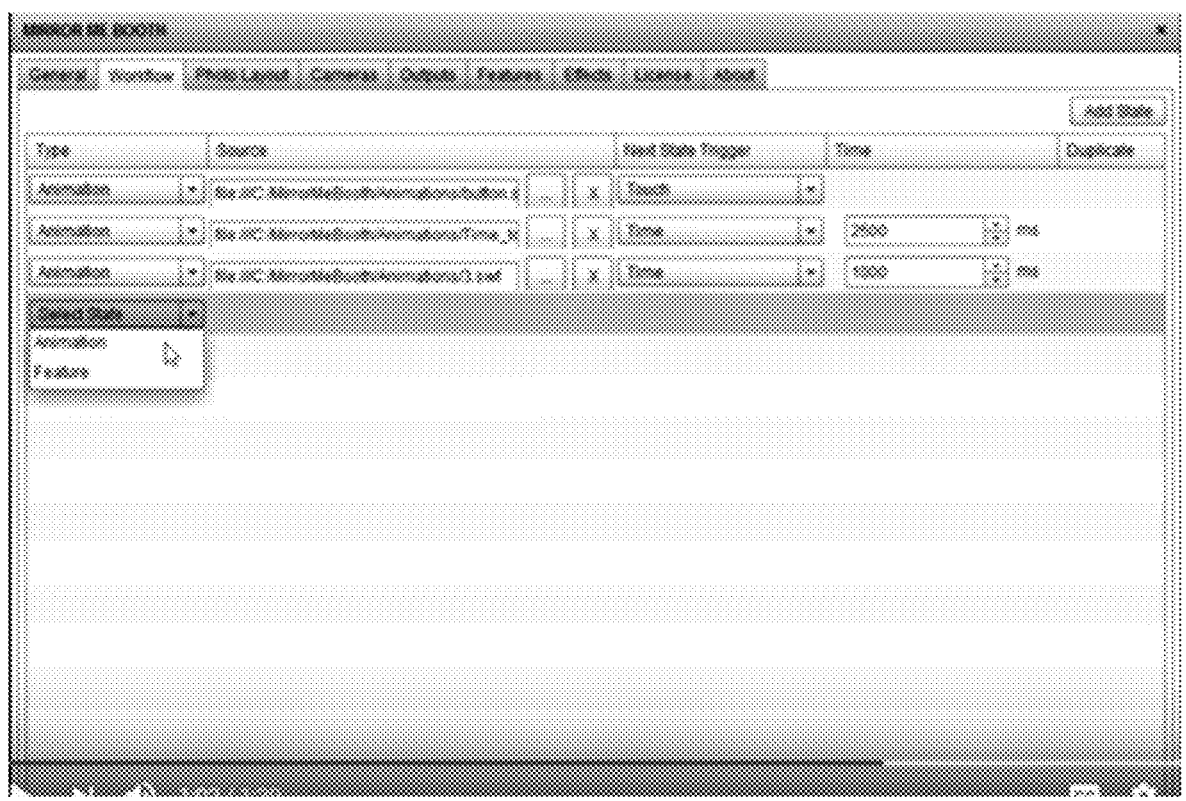

FIGS. 7 and 8 show schematic, pictorial illustrations of a configuration platform for customizing the interactive camera mirror, according to embodiments of the present invention.

As shown in FIG. 7, an operator can select a sequence of animations and features that will appear as a sequential process or workflow when an animation is displayed on site. Animations can be selected from a list of animations, which in some embodiments may include flash animations.

FIG. 8 is a screen shot of a workflow of an interactive session with a user. A technician can set steps of the presentation on the mirror, with each step showing a certain animation and defining how to proceed. For example, the technician can set the workflow to continue to the next step when the user touches the mirror, after a time period, after camera shots, a movement made by the user, and so on. Features of the sequence may also be output actions performed by the computer, such as triggering a photo, displaying a photo, executing an application such as a photo editing application, printing a photo, lighting LEDs, and sharing a photo over social media.

Figure 9:
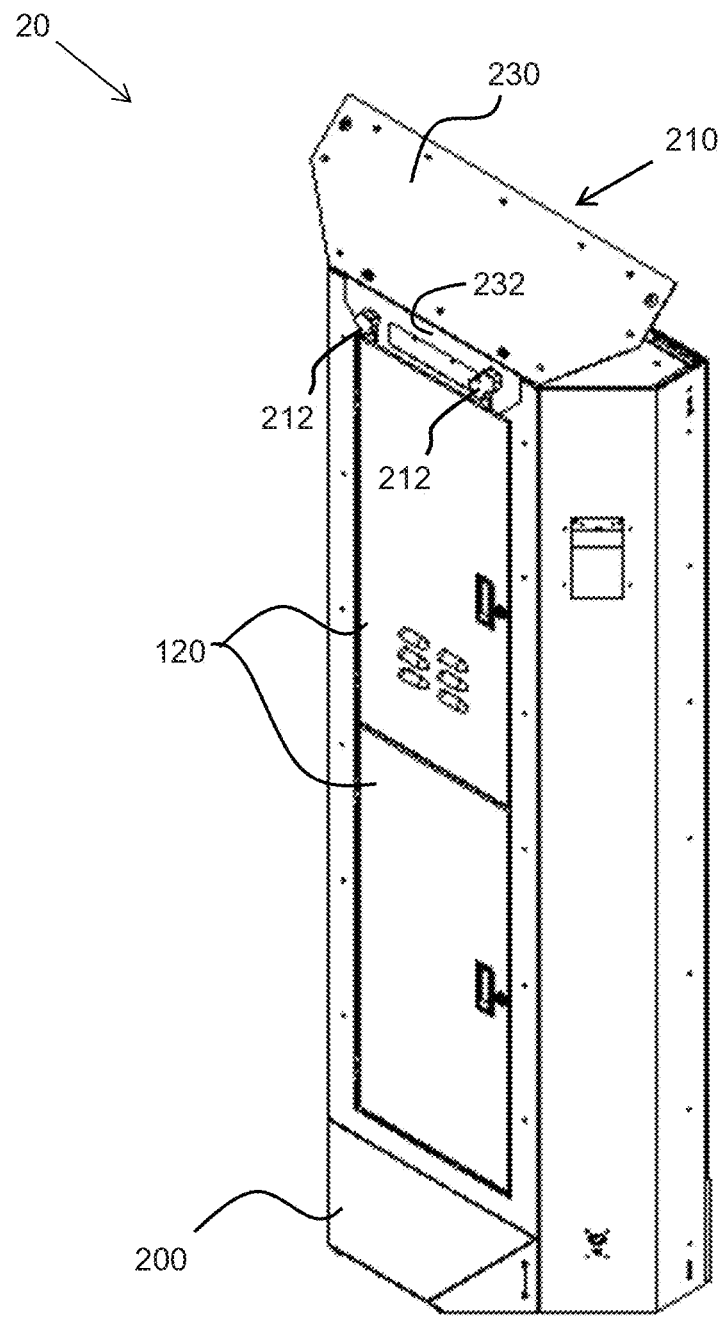
FIG. 9 pictorially illustrates a view of a back side of a PTS during operation, according to embodiments of the present invention.

FIG. 9 pictorially illustrates a view of a back side of a PTS 20 during operation, according to embodiments of the present invention. Shown are two back panels 120, described above with respect to FIG. 3, which may be opened to provide a service person with access to internal components of the PTS. Also shown is a protruding base 200 of the case, which provides stability to the case 40 when standing in an upright position as shown. A similar protruding base may be positioned on the front side of the case. The base may be fixed or removable.

Also shown in FIG. 9 is a reflector 210 of the PTS. The reflector has two parts, a reflector top 230, and a reflector back 232. The underside of the reflector top 230 is reflective, such that a light from a light source (such as a flash head or projector) inside the case 40 is reflected, at a tilt angle, towards a subject in the front of the case. The reflector is shown mounted at the top of the case, with an upward tilt from the top of the case. The tilt may be, for example, 45 degrees. The tilt is determined by the angle formed between the reflector top and reflector back. During operation, the reflector back is mounted to the back side of the case, using, for example, reflector back bolts 212. For transport, the reflector back bolts are loosened to detach the reflector, and the reflector top is then mounted to the case 40 top, protecting the reflector from damage, as well as protecting the light source inside the case from damage and from dirt.

Figure 10:
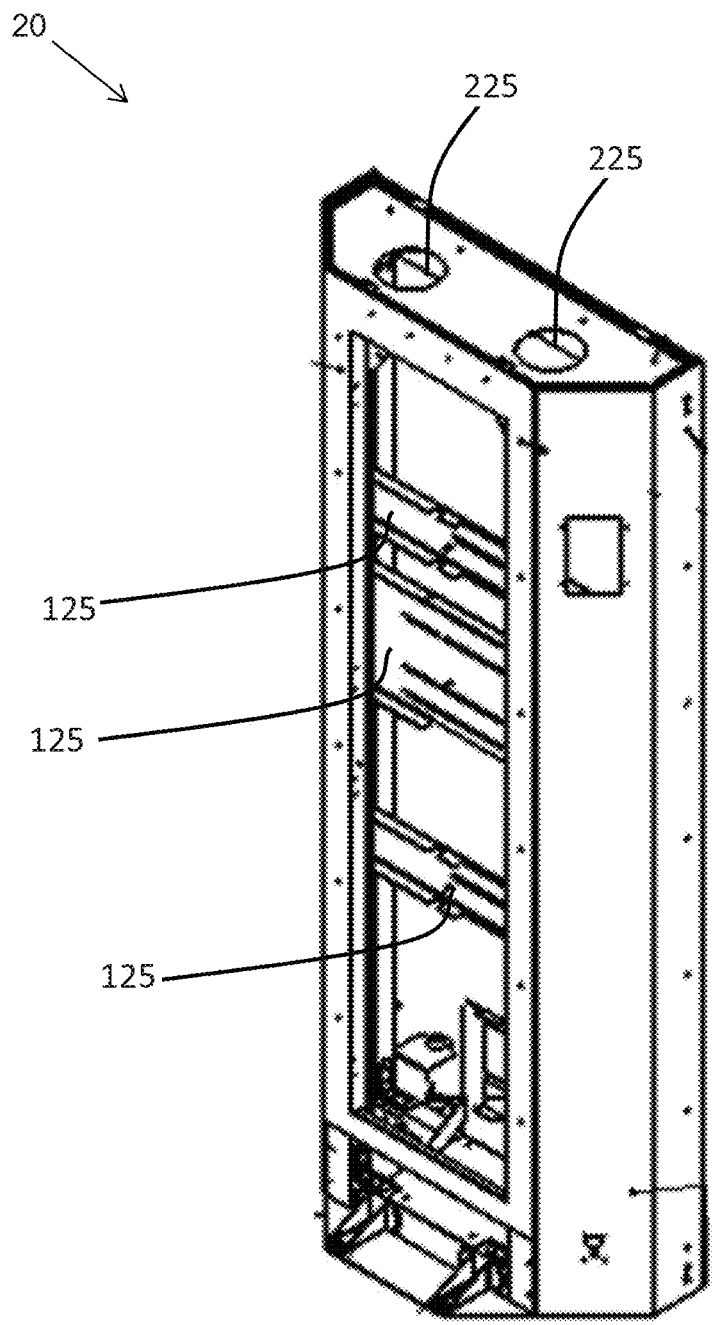
FIG. 10 pictorially illustrates a view of a back side of a PTS without back panels and without a top reflector, according to embodiments of the present invention.

FIG. 10 pictorially illustrates a view of a back side of the PTS 20 without back panels 120 and without the top reflector 210, according to embodiments of the present invention. Shown are three internal case mounting brackets 125, which are described above with respect to FIG. 3. Also shown are two openings 225 at the top of the case, through which one or more light projectors or flash heads, such as the flash head 132, described above with respect to FIG. 3, can project light from the case 40 towards a user in front of the case.

Figure 11A:
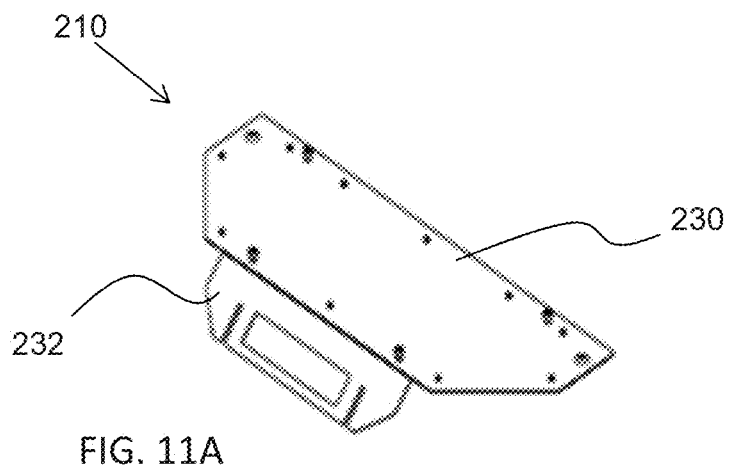
FIGS. 11A-11C pictorially illustrate views of a top reflector of a PTS, according to embodiments of the present invention.
Figure 11B:
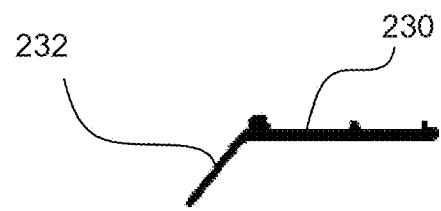
Figure 11C:
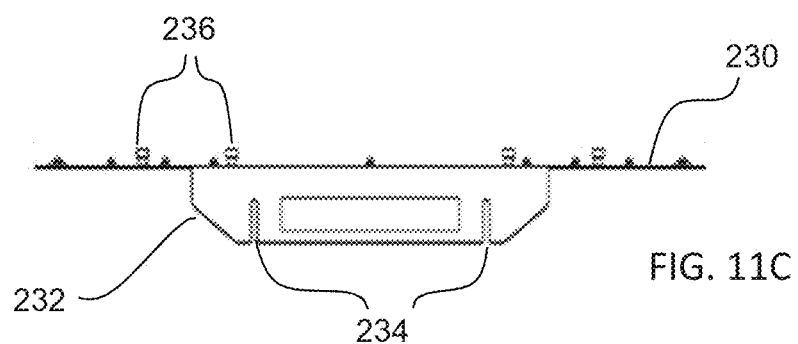

FIGS. 11A-11C pictorially illustrate views of a top reflector 210 of the PTS 20, according to embodiments of the present invention. The three views of FIGS. 11A-11C are respectively an isometric view, a side view, and a back view. In each view, both the reflector top 230 and the reflector back 232 are indicated. In addition, FIG. 11C shows slots 234 in the reflector back, which allow the position of the reflector during operation to be adjusted. That is, the height of the reflector above the top of the case 40 can be adjusted to be slightly higher or lower. In addition, FIG. 11C shows reflector top bolts 236, which are used to bolt the reflector top 230 to the top of the case when the case is prepared for transit.

Figure 12:
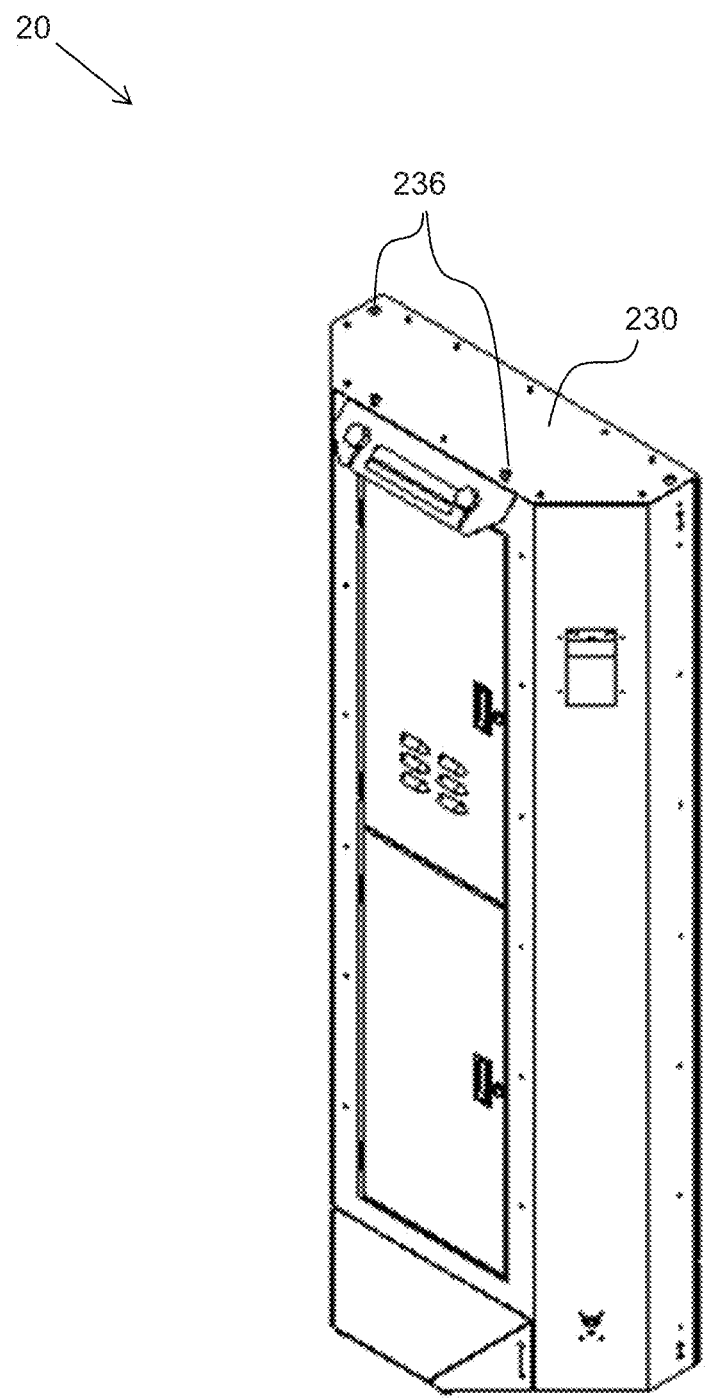
FIG. 12 pictorially illustrates a view of a back side of a PTS sealed for transport, according to embodiments of the present invention.

FIG. 12 pictorially illustrates a view of a back side of the PTS 20 sealed for transport, according to embodiments of the present invention. Also indicated in the figure are two of the mounting bolts 236 used to mount the reflector top 230 to the top of the case, as described above.

FIGS. 13A and 13B pictorially illustrate side views of the PTS 20 for respective sealed and operating configurations of the PTS 20, according to embodiments of the present invention. FIG. 13A shows the PTS 20 when sealed for transport. The reflector top 232 is bolted to the top of the case 40, while the reflector back 234 is slightly protruding for the back of the case. Also shown are the wheels 80, which are typically affixed for transit and which may be removed during operation. Also indicated are the front and back views of the protruding base 200 of the case. In FIG. 13B the case is shown in a configuration for operation. The reflector top 232 is up and the reflector back 234 is bolted to the back of the case 40. Lines indicate rays of light projected towards the reflector and reflected from the reflector towards a subject.

Figure 14A:
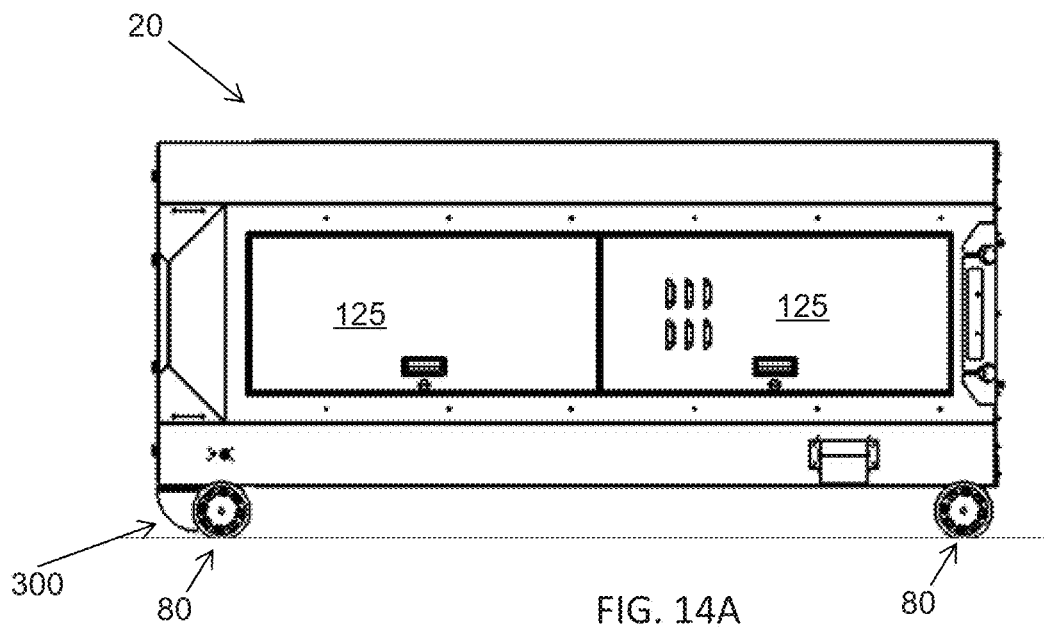
FIGS. 14A and 14B pictorially illustrate views of a PTS in respective positions of transport and lifting, according to embodiments of the present invention.
Figure 14B:
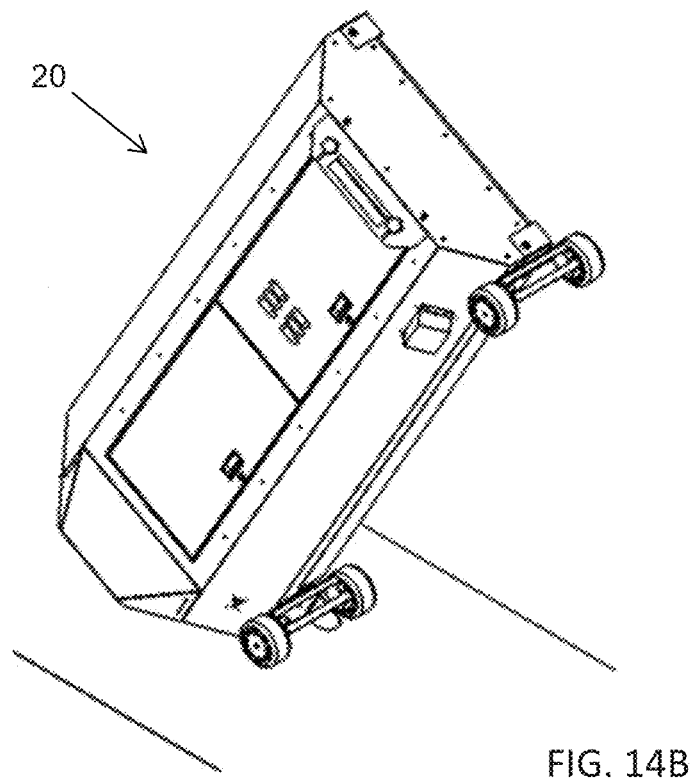

FIGS. 14A and 14B pictorially illustrate views of the PTS 20 in respective positions of transport and lifting, according to embodiments of the present invention. In FIG. 14A, the case 40 is shown on its side, with the wheels 80 allowing for easy transport. Also shown is a wheel bumper brake 300, which assists in lifting the case to an upright position and in returning the case from the upright position to the side position, as shown in FIG. 14B.

Figure 15A:
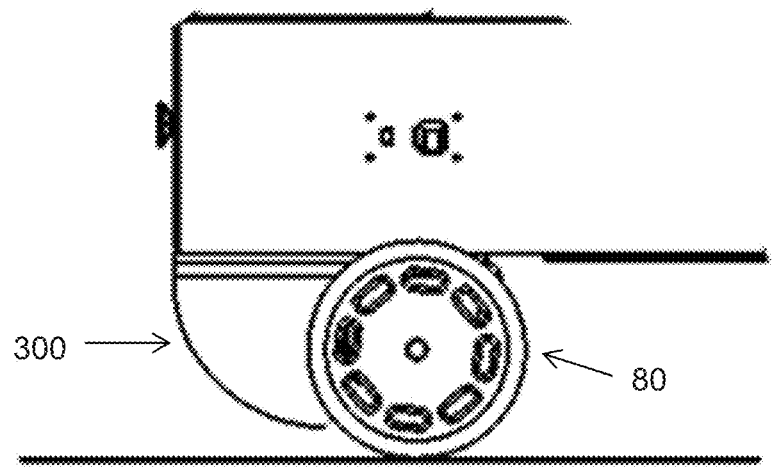
FIGS. 15A and 15B pictorially illustrate views of a PTS front wheel in respective positions of transport and lifting, according to embodiments of the present invention.
Figure 15B:
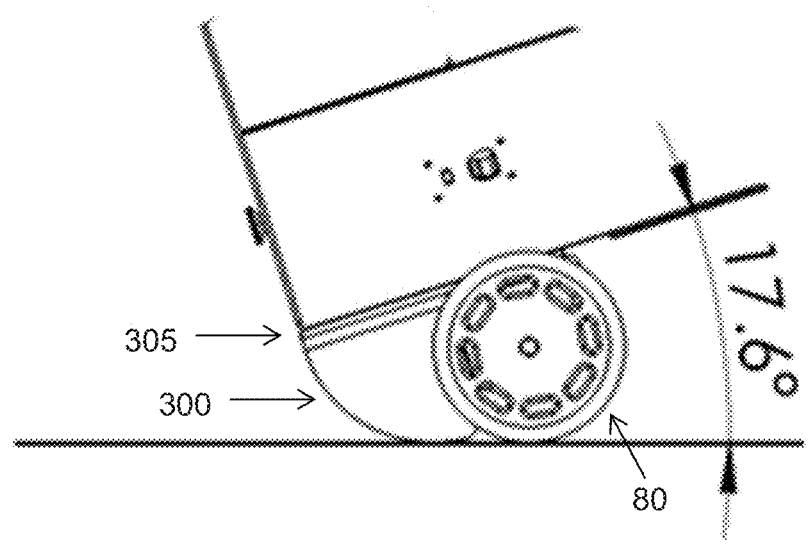

FIGS. 15A and 15B pictorially illustrate close-up views of a PTS 20 front wheel, together with the wheel bumper brake 300, in respective positions of transport and lifting, according to embodiments of the present invention. Typically each front wheel has an associated wheel bumper brake. As indicated in FIG. 15A, when the case is positioned on its side, the wheel bumper brake 300 is not touching the ground and the wheel 80 can move freely. FIG. 15B shows that when the case is tilted upwards, the wheel bumper brake 300 comes into contact with the ground, essentially braking further movement of the wheel. The tilt angle for the given example is shown as 17.6 degrees. Typically, the wheel bumper brake will be set to brake at an angle between 5 and 30 degrees. This angle permits braking at a lower tilt angle than if the wheel were free to move until the case corner 305 came into contact with the ground. The wheel bumper brake not only assists in braking the wheel, it also protects the case corner. The wheel bumper brake is typically part of the wheel assembly, which is typically detachable, so that the wheels and the wheel bumper brakes are detached from the case when the PTS is placed upright for operation.

Figure 16A:
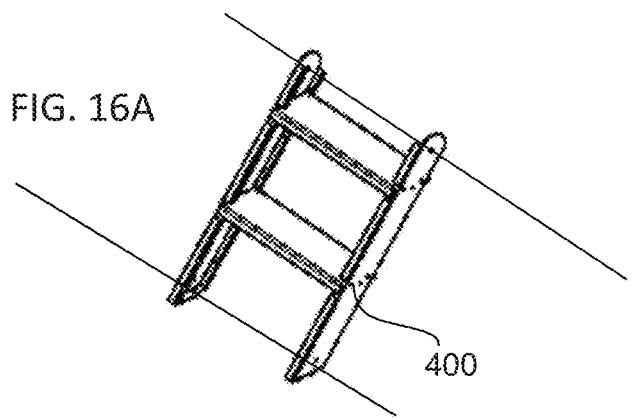
FIGS. 16A-16C pictorially illustrate views of a ladder of a PTS, according to embodiments of the present invention.
Figure 16B:
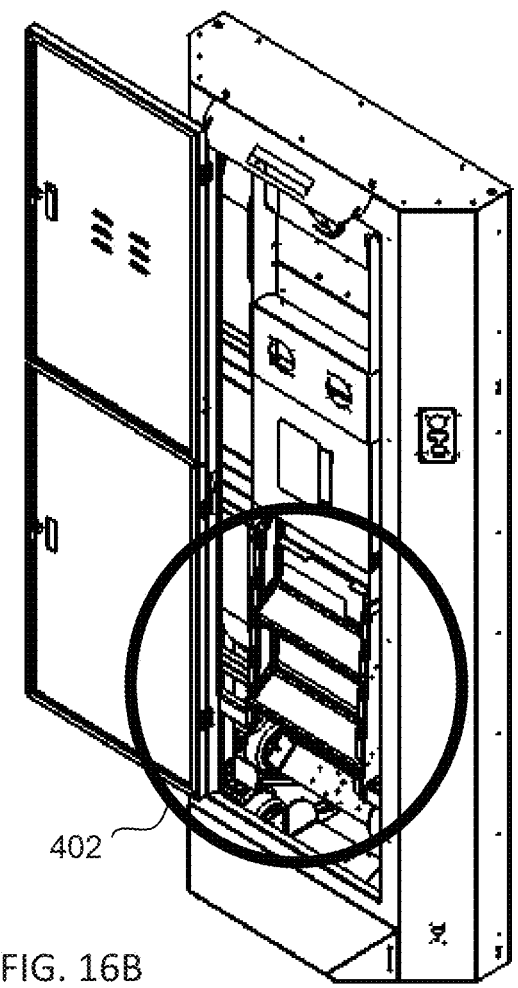
Figure 16C:
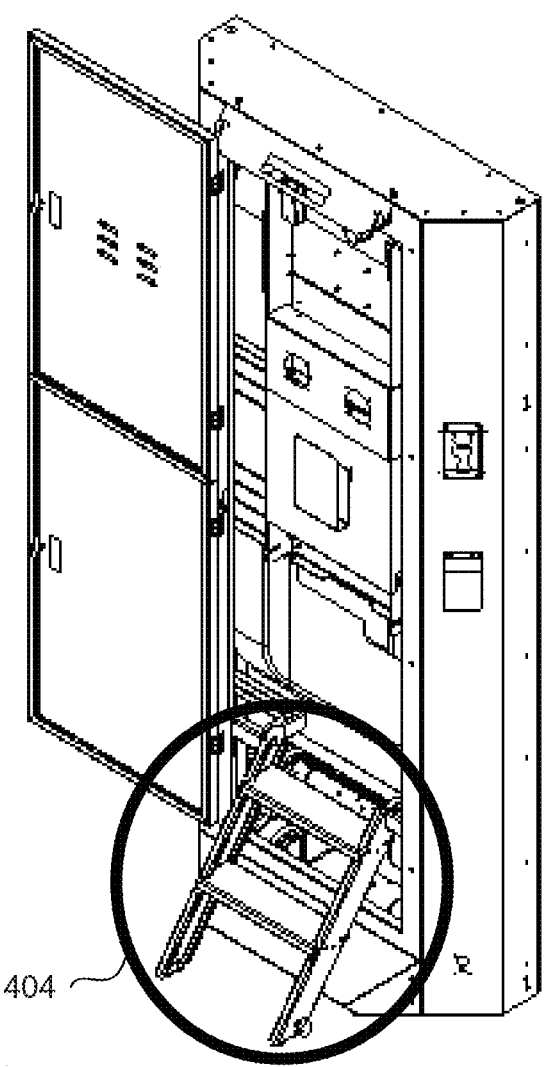

FIGS. 16A-16C pictorially illustrate views of a service step ladder of the PTS 20, according to embodiments of the present invention. Because the mounting position of the reflector 210 must be changed manually when the case is lifted upright, and again before the case is lowered to its side, a service step ladder 400 is a convenient accessory for setting up the PTS. As shown in FIG. 16B, the case 40 is configured with an internal mount for securing the service ladder 400 during transit, such that the service ladder is affixed in a position 402. During servicing, the service ladder may be affixed by a second, lower case mount at a tilted position 404 against the case.

Figure 17:
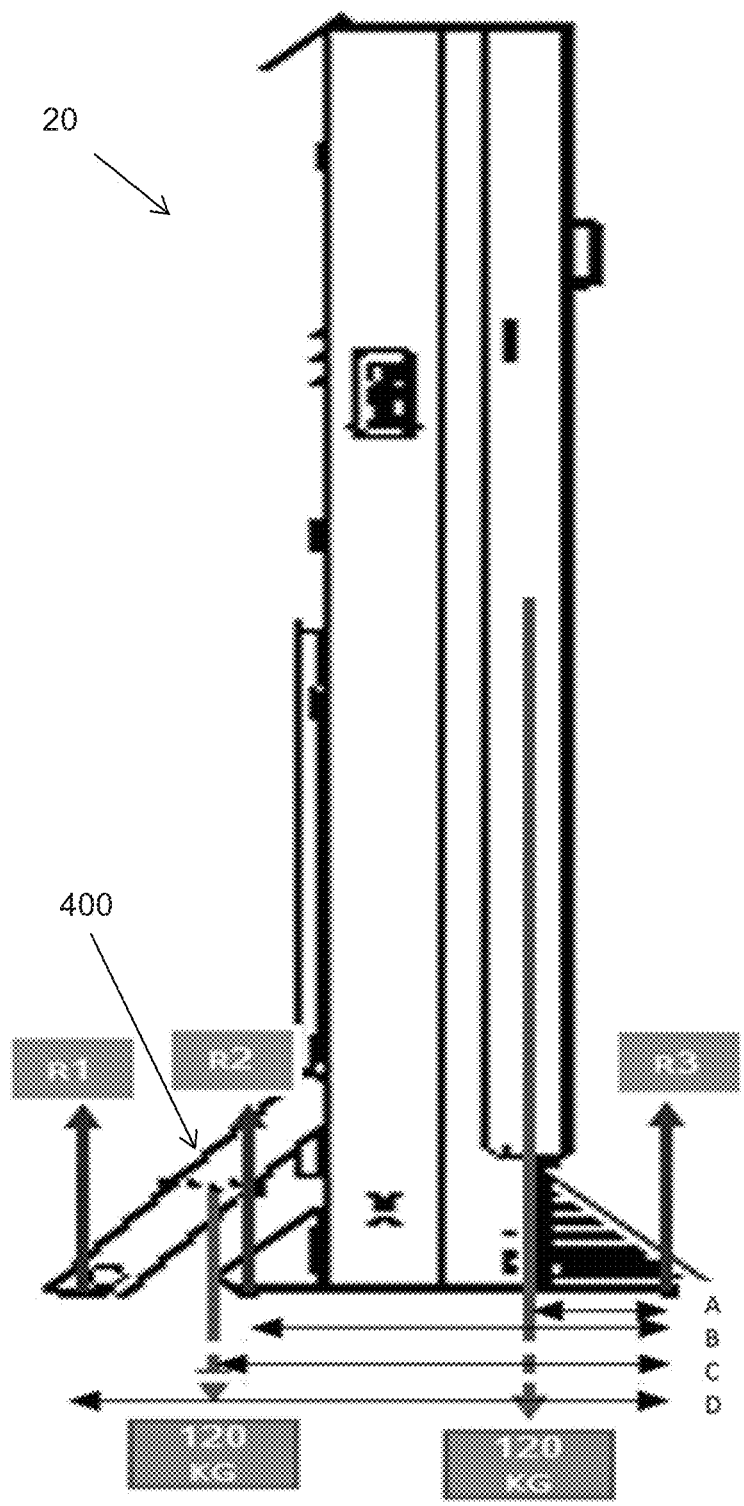
FIG. 17 pictorially illustrates the moments of forces that must be considered in determining the safety of the service step ladder for supporting a technician, according to embodiments of the present invention.

FIG. 17 pictorially illustrates the moments of forces that must be considered in determining the safety of the service step ladder 400 for supporting a technician, according to embodiments of the present invention. The moments are considered with respect to three points of possible rotation, R1, the base of the service ladder, and R2 and R3, the two sides of the case base. Four distances, as measured from R3, are relevant for the calculations: A, the distance to the vertical center of mass of the case; B, the distance to R2; C, the distance to the center of the ladder, where a technician would stand, and D, the distance to R1. For a typical case weight of 120 kg (~1200 newtons=1200 kg·m·s$^{-2}$) and a maximum technician weight of 120 kg (~1200 N), and for exemplary case dimensions of: A=0.165 m, B=0.49 m, C=0.53 m, and D=0.65 m, calculations of the moments show that the moments are all positive, meaning that the case would not slip:

$R_2+R_3=1200$ $-R_2*0.49+1200*0.165=0$ $R_2=\sim404$ $R_3=\sim796$ $-R_2 0.49+1200*0.165-R_1*0.65+1200*0.53=0$ $R_1=\sim978$ (In the calculations above, R1, R2, and R3 are indicated in terms of newtons.)

Processes associated with the system can be rearranged and/or one or more such steps can be omitted to achieve the same, or similar, results to those described herein. It is to be understood that the embodiments described hereinabove, such as particular components and dimensions of the system, are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

In the figures and/or description herein, the following reference numerals have been mentioned:

| Numeral | Item |
|---|---|
| 20 | Photo Terminal Stand (PTS) |
| 30 | user |
| 40 | PTS case |
| 50 | mirror of PTS |
| 55 | frame of mirror |
| 60 | computer presentation on mirror, such as an animation or image |
| 70 | bottom side of case |
| 80 | wheels of case |
| 90 | cover of the case |
| 100 | side (left/right) of case |
| 120 | door or hinged panels |
| 125 | mounting brackets installed inside case |
| 130 | camera |
| 132 | flash head |
| 134 | connectors for providing power to the flash head |
| 140 | computer |
| 146 | camera connector (connects the camera to the computer) |
| 160 | display, which can be a computer monitor, a television, and the like |
| 162 | monitor connector (connects the monitor to the computer) |
| 164 | input device connector (connector to computer, such as a USB connector) |
| 170 | touch overlay frame, as an example of a user input device |
| 180 | mirror mount |
| 200 | case base |
| 210 | reflector |
| 212 | camera reflector mounting bolts |
| 225 | case top openings |
| 230 | reflector top |
| 232 | reflector back |
| 300 | wheel bumper brake |
| 400 | service ladder |

| Numeral | Item |
|---|---|
| 402 | transit position of service ladder |
| 404 | service position of service ladder |

The foregoing description and illustrations of the embodiments of the invention have been presented for the purposes of illustration. They are not intended to be exhaustive or to limit the invention to the above description in any form. Any term that has been defined above and used in the claims, should be interpreted according to this definition.

Processing elements of the system described herein may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or deployed to be executed on multiple computers at one site or one or more across multiple sites. Memory storage for software and data may include multiple one or more memory units, including one or more types of storage media. Examples of storage media include, but are not limited to, magnetic media, optical media, and integrated circuits such as read-only memory devices (ROM) and random access memory (RAM). Network interface modules may control the sending and receiving of data packets over networks. Method steps associated with the system and process can be rearranged and/or one or more such steps can be omitted to achieve the same, or similar, results to those described herein.

It is to be understood that the embodiments described hereinabove are cited by way of example, and that the present invention is not limited to what has been particularly shown and described hereinabove.

What is claimed:

1. A photo terminal stand system, comprising:
a case, in which a front face thereof is a one-way mirror,
a computer display, mounted behind the one-way mirror, wherein a graphical presentation presented by the computer display is seen outside the case through the one-way mirror;
a camera, mounted in the case;
a touch overlay frame placed over the one-way mirror, for receiving a touch input;
a computer, configured to receive the touch input and responsively to activate the camera to record a subject in front of the case;
a camera flash mounted inside the case to direct a flash through one or more openings at a top of the case when the case is in an upright position for operation; and
a reflector having two alternative points of attachment to the case, wherein when affixed at a first point of attachment the reflector is positioned to cover one or more openings at the top of the case during transit of the case, and wherein when affixed at a second point of attachment the reflector is positioned to reflect light from the camera flash towards the subject.

* * * * *